Patented Apr. 24, 1945

2,374,485

UNITED STATES PATENT OFFICE 2,374,485

PROCESS FOR THE REMOVAL OF ORGANIC RADICALS FROM N-SUBSTITUTED UREAS

Vernon E. Haury, El Cerrito, Calif., assignor to Shell Development Company, San Francisco, Calif., a corporation of Delaware No Drawing. Application April 10, 1944,
Serial No. 530,409

19 Claims. (Cl. 260—553)

This invention relates to the treatment of urea derivatives and more particularly pertains to the removal of organic radicals from N-substituted urea derivatives by a process which comprises reacting the said N-substituted urea derivatives with ammonia in the presence of a catalyst. The invention relates further to a process for the production of monoalkyl ureas which are substantially free from urea and from higher alkyl-substituted ureas which comprises reacting a urea-free higher alkyl-substituted urea with ammonia in the presence of a catalyst, and separating the desired monoalkyl-substituted urea from the reaction mixture.

The invention provides a particularly valuable method for effecting the molecular degradation or reversion of N-substituted urea derivatives to ureas of lower molecular weight. This result is accomplished by contacting a mixture comprising the said N-substituted urea derivative and ammonia with a hydrogenation-dehydrogenation catalyst at a reaction temperature and at a pressure of between about 15 p. s. i. and about 500 p. s. i.

More specifically stated, N-substituted ureas, e. g., N-alkyl-substituted ureas, are degraded or converted to ureas of lower molecular weight in accordance with the presently disclosed process by reacting the said N-substituted urea with ammonia at a temperature of between about 100° C and about 200° C. at a pressure of between about 50 p. s. i. and about 150 p. s. i. and in the presence of a mutual solvent for ammonia and for the said N-substituted urea and in the presence of a hydrogenation-dehydrogenation catalyst, and preferably such a catalyst which comprises active nickel.

A specific embodiment of the invention is represented by the procedure which may be employed to advantage in the dealkylation of unsymmetrical di-n-butyl urea in accordance with the following equation:

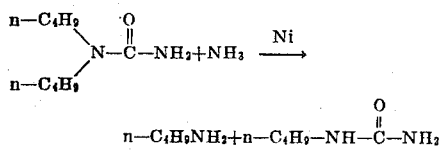

$$n-C_4H_9NH_2 + n-C_4H_9-NH-\overset{O}{\overset{\|}{C}}-NH_2$$

In accordance with this embodiment the unsymmetrical di-normal butyl urea and ammonia may be dissolved in a solvent comprising a lower aliphatic alcohol. The resulting solution may then be contacted with a catalyst comprising active nickel at a temperature of about 125° C. and at a pressure of about 100 p. s. i. When the reaction is complete the dealkylated product may be separated from the reaction mixture by fractional distillation, crystallization from a suitable solvent, or other suitable means.

The degradation process of the present invention is not limited to the removal of alkyl groups from N-alkyl-substituted ureas, however, but may also be successfully applied to the degradation or reversion of a variety of N-substituted ureas. In general, it may be applied to the conversion to ureas of lower molecular weight of urea derivatives wherein there is at least one hydrocarbon radical substituted upon the nitrogen atom of the urea molecule. Any or all of the hydrogen atoms on the urea molecule may be symmetrically or unsymmetrically substituted with similar or dissimilar hydrocarbon radicals. The process may thus be applied to the degradation of mono-, di-, tri- or tetra-substituted urea derivatives wherein the substituent groups are hydrocarbon radicals. The said hydrocarbon radicals which are substituted upon the nitrogen atoms of the urea molecule may be either aliphatic, alicyclic, olefinic, cycloolefinic, acetylenic or aromatic in character. Suitable radicals are, for example, the methyl, ethyl, n-propyl, isopropyl, n-butyl, secondary butyl, isobutyl, tertiary butyl, amyl, hexyl, heptyl, octyl, nonyl, decyl, undecyl, dodecyl, heptadecyl, octadecyl, allyl, methallyl, crotyl, isocrotyl, styryl, cyclopentyl, cyclopentenyl, methyl cyclopentyl, methyl cyclopentenyl, cyclohexyl, cyclohexenyl, ethyl cyclohexenyl, dimethyl cyclohexyl, phenyl, benzyl, tolyl, xylyl, and naphthyl radicals and the like. The process of the invention may be applied with particular advantage, however, to the dealkylation of N-alkyl-substituted ureas, particularly where the alkyl groups substituted upon the nitrogen atoms of the urea molecule contain fewer than 6 carbon atoms. These hydrocarbon radicals may be substituted with non-interfering functional groups, i. e. groups which are non-reactive toward ammonia under the conditions of the reaction, such as the alkyloxy, hydroxy, carbonyl and amide groups.

Representative urea derivatives which may be converted to ureas of lower molecular weight by the presently disclosed process are, therefore, methyl urea, symmetrical dimethyl urea, trimethyl urea, tetramethyl urea, symmetrical diethyl urea, unsymmetrical diisopropyl urea, triethyl urea, tetraethyl urea, symmetrical diisopropyl urea, hexyl urea, symmetrical diheptyl urea, octadecyl urea, symmetrical di-n-butyl urea, unsymmetrical di-n-butyl urea, symmetrical diisobutyl urea, unsymmetrical diisobutyl urea, symmetrical di-secondary butyl urea, unsymmetrical di-secondary butyl urea, symmetrical di-tertiary butyl urea, unsymmetrical di-tertiary butyl urea, monoisopropyl urea, N-methyl-N'-ethyl urea, N-methyl-N'-isobutyl urea, N-ethyl-N'-isobutyl urea, N-n-propyl-N'-isobutyl urea, N-isopropyl-N'-isobutyl urea, N,N-diethyl-N'-isopropyl urea, unsymmetrical diallyl urea, symmetrical dimethallyl urea, N-methyl-N'-cyclohexyl urea, N,N-dimethyl-N'-methyl-N'-cyclohexyl urea, dicyclohexyl urea, N-n-propyl-N'-cyclohexenyl urea, N-cyclopentyl-N'-allyl urea, N,N-dimethyl-N'-phenyl urea, N-ethyl-N-isopropyl-N'-tolyl urea, N,N-diethyl-N'-methyl-N' - chlorophenyl urea, N,N-diethyl - N - beta methoxy ethyl urea, symmetrical gamma-hydroxy-N-propyl urea and the like. These compounds may be treated either singly or in admixture with each other. When treated singly, the reaction may lead to the formation of a single species of a urea of lower molecular weight. However, when treating a mixture of different species of substituted ureas, a mixture of different species of urea derivatives of lower molecular weight may be formed. This mixture may be used without resorting to the separation of the constituents, or, if desired, separation of the urea derivatives may be effected by any suitable means, as by fractional distillation or fractional crystallization.

The presently disclosed urea reversion process may be modified within limits to effect the reversion or degradation of N-substituted ureas in any desired degree. Thus, the higher substituted ureas, i. e. those containing three and four substituent groups, may be degraded to a lower urea, i. e. one containing one or two substituent groups, or to urea itself. Similarly, di-substituted ureas may be converted to urea or to mono-substituted ureas and, if desired, mono-substituted ureas may be degraded to urea by the process of the present invention. The process is particularly well adapted to the conversion of dialkyl-substituted ureas to mono-substituted ureas, when the alkyl substituent groups contain fewer than six carbon atoms. The partial degradation of the higher derivatives may be accomplished to the desired degree by proper control of the reaction conditions, especially the reaction time, the temperature, the pressure and the relative amounts of ammonia and urea derivative used, as is more fully described hereinbelow.

The process of the invention may be executed in a batch, intermittent or continuous manner. When carrying out the process as a batch procedure, a quantity of the urea derivative to be treated together with a suitable quantity of ammonia, a solvent and a catalyst, e. g. an active nickel catalyst, may be heated at superatmospheric pressure to a temperature sufficiently elevated to effect the degradation process. When the reaction is complete the reaction mixture may be distilled to separate the desired urea derivative and the other constituents of the reaction mixture or it may be fractionally crystallized from a suitable solvent to achieve the same result. When carrying out the process as a continuous process a stream of the higher N-substituted urea together with the desired amount of ammonia may be continuously contacted with a quantity of catalyst, e. g. an active nickel catalyst in pellet form, in a suitable reaction chamber at superatmospheric pressures and at a temperature sufficiently high to maintain the reactants in the vapor state and to promote the desired catalytic degradation. The products of the reaction may be continuously withdrawn from the said reaction chamber, the desired degraded urea derivative separated from the other constituents of the reaction mixture and any unreacted starting materials recovered and recycled.

The ammonia which is used as a constituent of the reaction mixture may be introduced as ammonia gas, as liquid ammonia or, in some cases, in the form of its aqueous solution, i. e. ammonium hydroxide. As indicated hereinabove, the amount of ammonia added to the reaction mixture may be of critical importance in determining the degree of degradation of the urea derivative effected by the reaction. Thus, where it is desired to completely remove all of the substituent groups from the urea molecule and form urea as a product of the reaction, a large molar excess of ammonia may preferably be employed. However, when it is desired to effect the reversion of a higher-substituted urea, e. g. a tri-substituted urea to a lower urea, an amount of ammonia should be employed which is approximately equivalent to or which is slightly less than the amount theoretically required to effect the desired conversion. Thus, in the instance cited, i. e. in the case of the reversion of a tri-substituted urea to a mono-substituted urea, approximately two molar equivalents of ammonia should be used for each molar equivalent of tri-substituted urea. Alternatively when it is desired to degrade a di-substituted urea to a mono-substituted urea, about one molar equivalent of ammonia should be used for each molar equivalent of di-substituted urea.

Any material which is active as a hydrogenation-dehydrogenation catalyst may be used to effect the degradation of the urea derivatives in accordance with the process of the invention. Suitable catalysts therefore include such materials as finely-divided nickel, nickel on kieselguhr, nickel on pumice, colloidal platinum, finely-divided palladium, metallic chromium, alumina, iron oxide-chromium oxide compositions, copper oxide-chromium oxide compositions and the like. The active nickel catalysts have proved particularly effective, active nickel in the form commonly referred to as Raney nickel being a preferred catalyst for carrying out the reversion process. The catalyst may be used in any suitable amount, the amount used being dependent upon the nature of the catalyst, the character of the reacting substances, the operating conditions, etc. In general, however, an amount of catalyst ranging from between about 0.5% and about 10%, preferably about 4%, based on the amount of urea derivative, represents a suitable amount when carrying out the process as a batch process. In continuous operation, a sufficient amount of catalyst should be used to secure the desired conversion within the contact time employed.

Although the reversion process may be carried out in the absence of a solvent, it is usually preferred to operate in the presence of a mutual solvent for the substituted urea and the ammonia. Any solvent which will dissolve these substances may be used. Examples of suitable solvents include the lower aliphatic alcohols, i. e. those containing from one to five carbon atoms, such as methyl alcohol, ethyl alcohol, n-propyl alcohol, isopropyl alcohol, the butyl alcohols, the amyl alcohols and mixtures of these alcohols; the ketones, especially the $C_3$ to $C_6$ ketones, including acetone, methyl ethyl ketone, diethyl ketone, methyl butyl ketone, ethyl propyl ketone and the dipropyl ketones; certain of the hydrocarbon solvents such as the aromatic hydrocarbon solvents; and the ethers including dimethyl ether, dibutyl ether and the mixed aromatic-aliphatic ethers. Of these the lower aliphatic alcohols, particularly ethanol, represent preferred solvents. These solvents may be used in any amount required to dissolve the reactants. It is usually desirable to use just sufficient solvent to result in the formation of an approximately saturated solution of urea derivative in the said solvent. In the case of the lower alkyl ureas a ratio of about 1 part by weight of urea to about 2 parts by weight of solvent, e. g. ethanol, may be a desirable ratio.

The temperature to be employed is variable depending upon the nature of the starting material and the other operating conditions, but, in general, will lie within the range of between about 50° C. and the decomposition temperature of the urea derivatives which are in the reaction mixture. In some cases the upper temperature limit may be as high as about 450° C. When carrying out the reaction in the liquid phase a preferred temperature is about the boiling temperature of the solution at the particular pressure employed but may be, for example, between about 100° C. and about 200° C. When operating in the vapor phase somewhat higher temperatures, e. g. temperatures of between about 300° C. and about 400° C., may be employed.

The reaction may best be carried out at pressures which are higher than atmospheric pressures. In most instances pressures of between about 15 p. s i. and about 500 p. s. i. are sufficiently elevated to effect the desired conversion. When dealkylating alkyl ureas, pressures of between the limits of about 50 p. s. i. and about 150 p. s. i. are preferred. The desired pressure may preferably be obtained by the introduction of ammonia into the reaction mixture contained in a closed vessel, the ammonia being added all at once or intermittently as desired to maintain the desired pressure.

The reaction time may be varied to suit the needs of each particular reaction but may be between about 1 hour and about 20 hours, preferably between about 2 hours and about 5 hours, when operating in the liquid phase. When operating in the vapor phase, at higher temperatures, a contact time of from about 10 seconds to about 60 seconds is usually adequate to secure the desired conversion.

Any type of apparatus adapted to batch or continuous operation under pressure may be employed. In batch operation the apparatus should preferably be fitted with means for agitating or stirring the reaction mixture. Means should also be provided for heating the reaction mixture to the desired temperature level and for the introduction of further amounts of ammonia solvent and/or urea derivative, if necessary or desirable.

The degraded urea may be isolated from the reaction mixture and purified by any desired method, as by fractional distillation or fractional crystallization, from a suitable solvent. In a preferred method the reaction mixture may be worked up by adding a suitable quantity of a diluent, e. g water, and distilling the resulting mixture, thereby separating the primary amine which is a product of the reaction as well as any solvent which may be present. After removal of the primary amine and the solvent the aqueous mixture may be cooled to separate the higher urea derivatives, i. e. the unreacted starting material. The mother liquor may then be evaporated under reduced pressure if desired, thereby concentrating the solution sufficiently to effect the separation of the desired degraded urea.

The following operation, in which the amounts of reactants are given in parts by weight, for the dealkylation of unsymmetrical di-n-butyl urea illustrates the process of the invention:

A reaction mixture comprising about 9 parts of unsymmetrical di-n-butyl urea, 10 parts of a solvent comprising isopropyl alcohol, 5 parts of anhydrous ammonia and ½ part of Raney nickel catalyst were heated with agitation in a pressure vessel maintained at a temperature of about 125° C. and a pressure of about 15 atmospheres. After the reaction was complete, i. e. after about 2 hours, the reaction mixture was cooled and about 10 parts of water added thereto. The resulting aqueous mixture was filtered to remove the catalyst and distilled to separate the alcohol solvent and the di-n-butyl amine which was a product of the reaction mixture. On cooling, a quantity of unreacted dibutyl urea separated from the residual liquor. This was removed and the residual aqueous solution evaporated at reduced pressure to effect the separation of the urea product. About 3 parts of urea was obtained. This represented a yield of 88%.

The degradation process of the present invention may be applied with particular effectiveness to the production of monoalkyl ureas which are substantially free from urea as well as from higher alkyl-substituted ureas, i. e. from di- tri- and tetra-alkyl-substituted ureas. The production of such monoalkyl ureas is of commercial importance in connection with the production of starting materials to be used in the production of urea-formaldehyde resins. Such resins are prepared by the condensation of urea or of monoalkyl ureas with formaldehyde and are used, for example, as modifying agents for nitrocellulose, as components for surface coatings, as adhesives, as pigment-dispersing media, in cold set inks and in other uses where a thermoplastic and thermosetting resin may be used to advantage. For these and other uses it is important that the products be substantially free from urea and from higher alkyl ureas or their derivatives, since the presence of these substances deleteriously affects the properties of the finished resin. It is therefore of importance that substantially pure monoalkyl-substituted ureas be employed as starting materials for the synthesis of the finished resin.

It has been found that monoalkyl urea derivatives which are substantially free from urea and from higher alkyl ureas may be prepared by a novel process which, broadly stated, comprises reacting at least one species of alkyl urea having more than one alkyl group of less than six carbon atoms with ammonia at a pressure of between about 15 p. s. i. and about 500 p. s. i. at a reaction temperature and in the presence of a hydrogenation-dehydrogenation catalyst, thereby forming a reaction mixture comprising a monoalkyl-substituted urea together with higher alkyl ureas and separating the said monoalkyl substituted urea from the said higher alkyl urea.

The process may be advantageously operated in conjunction with processes for the formation of alkyl ureas which contain more than one alkyl group. Thus, substantially pure monoalkyl-substituted ureas wherein the alkyl groups substituted upon the nitrogen atoms of the ureas contain fewer than six carbon atoms may be prepared by alkylating urea, thereby forming a reaction mixture comprising unreacted urea, a monoalkyl urea and a preponderant amount of higher alkyl ureas. The reaction mixture may then be contacted with a solvent, e. g. an aqueous solvent, thereby separating the relatively soluble urea and monoalkyl urea from the said higher alkyl ureas. The higher alkyl ureas may then be converted to a monoalkyl urea by reacting them with a limited amount of ammonia in the presence of a catalyst at a pressure of between about 15 p. s. i. and about 500 p. s. i. and a temperature of between about 50° C. and about 450° C., thereby forming a reaction mixture containing a preponderant amount of the desired monoalkyl urea together with a lesser amount of unreacted higher-alkyl urea. The desired monoalkyl urea may be separated from the unreacted higher-alkyl urea by treating the mixture of the two substances with a selective solvent, e. g. water, for the monoalkyl urea.

As applied to the preparation from urea of pure monoisopropyl urea the process of the invention comprises isopropylating urea, thereby forming a reaction mixture essentially comprising diisopropyl urea but containing also lesser amounts of unreacted urea and of monoisopropyl urea. The said reaction mixture may then be contacted with water in order to separate the diisopropyl urea, which is relatively insoluble in water, from the water-soluble urea and monoisopropyl urea. The diisopropyl urea may then be dissolved in a solvent comprising a lower aliphatic alcohol and reacted with ammonia in the approximate ratio of somewhat more than two molar equivalents of diisopropyl urea for each molar equivalent of ammonia, the said reaction being effected at a temperature of between about 100° C. and about 200° C., at a pressure of between about 50 p. s. i. and about 150 p. s. i. and in the presence of a hydrogenation-dehydrogenation catalyst comprising active nickel. This results in the formation of a reaction mixture largely comprising the desired monoisopropyl urea but containing also a relatively minor amount of unreacted diisopropyl urea as well as an amount of isopropyl amine which is equivalent to the amount of monoisopropyl urea formed by the reaction. The monoisopropyl urea may be separated from the reaction mixture by adding water to the reaction mixture and distilling the diluted solution produced in this fashion to effect the separation of the alcohol solvent and of the isopropyl amine. The aqueous solution may then be cooled, thereby effecting the separation of the diisopropyl urea which may be removed by any desired means, as by filtration. The mother liquor may then be further concentrated and cooled to cause the precipitation of the desired monoisopropyl urea which is substantially free from urea and from diisopropyl urea.

The process may be successfully applied to the production of a variety of urea- and higher-alkyl-urea-free monoalkyl ureas. For practical purposes, however, it is limited to the production of pure monoalkyl ureas wherein the alkyl group contains fewer than six carbon atoms, since the solubility characteristics of the monoalkyl ureas of higher molecular weight are such that their separation from a mixture of urea and monoalkyl ureas is not usually a problem. Thus, an alkyl urea containing an alkyl group of more than five carbon atoms may generally be prepared by treating a molar excess of urea with an alkylating agent and separating the relatively soluble urea from the relatively insoluble monoalkyl-substituted urea by extracting, leaching or washing the alkylation mixture with a suitable solvent, e.g. water. This cannot usually be done with the alkyl derivatives of lower molecular weight, e.g. those containing less than six carbon atoms, however, since these compounds have physical properties, especially solubility characteristics, which closely aproximate those of urea itself. Hence they cannot be satisfactorily separated from urea by the usual methods as by crystallization from water or other solvents. The compounds to which the present process may be applied to greatest advantage include, therefore, the methyl, ethyl, propyl, butyl and amyl ureas, such as methyl urea, ethyl urea, normal propyl urea, isopropyl urea, normal butyl urea, isobutyl urea, secondary butyl urea, tertiary butyl urea, normal pentyl urea, isopentyl urea, secondary pentyl urea, tertiary pentyl urea, neopentyl urea and the analogues and suitable substitution products of these compounds, suitable substitution products including, in general, those containing non-interfering functional groups such as the ether, hydroxyl, amide and keto groups and the like.

The higher-alkyl-substituted ureas, i.e. the di-, tri- or tetra-substituted ureas or mixture of di-, tri- and/or tetra-substituted ureas may be prepared by any method known heretofore to the prior art for alkylating urea. The higher-alkyl-substituted urea may be prepared, for example, by reacting urea with an alkylating agent such as a primary amine. It may also be prepared by the alkylation of urea with an aldehyde or a ketone in the presence of ammonia and hydrogen at superatmospheric pressures as described and claimed in the co-pending application, Serial No. 475,214, filed February 8, 1943.

The dealkylation step by which the di-, tri- or tetra-substituted urea is converted to a mono-substituted urea may be carried out substantially as described hereinabove for the degradation of N-substituted ureas, provided that the amounts of reactants employed and the operating conditions are such as to favor the formation of the monoalkyl derivatives and inhibit the formation of urea. Relatively mild dealkylating conditions must, therefore, be provided so as to prevent the reaction from proceeding too far.

This desired result may be satisfactorily attained in most cases by careful control of the reaction conditions, especially the reaction temperature, the pressure employed, the reaction time, the relative amounts of reactants, etc. Excessively high temperatures and pressures, for example, tend to favor the complete dealkylation of the higher urea derivative and form urea as the principal product of the dealkylation. The reaction temperature and pressure should, therefore, be kept at a level which is just sufficient to effect the desired conversion. When operating in the liquid phase a temperature of between about 50° C. and about 150° C., preferably about 125° C., represents a satisfactory operating temperature in most cases. For vapor phase operation the temperature should be the minimum temperature necessary to keep the reactants in the vapor phase while within the reaction chamber. The pressure likewise should be kept at a relatively low level. In general, pressures of less than about 500 p. s. i. will suffice, a pressure of about 100 p. s. i. being a preferred pressure.

The reaction time or contact time should also be kept at a minimum. For liquid phase operation a reaction time of between about one hour and about five hours, preferably about two hours, is adequate, while when operating in the vapor phase, a contact time of between about ten seconds and about sixty seconds is desirable.

The ammonia may be added as gaseous ammonia, as liquid ammonia or, in some cases, as an aqueous solution of ammonia. It may be added all at once at the beginning of the reaction or intermittently during the course of the reaction as required. It is of particular importance to carefully regulate the amount of ammonia which is added to the reaction mixture, since, if more ammonia is added than is required to remove the desired number of alkyl groups, e. g. to remove one alkyl group from a dialkyl-substituted urea, the dealkylation reaction tends to proceed too far and completely degrade a portion of the starting material to urea itself. The amount of ammonia which is added to the reaction mixture should, therefore, be not more than, and preferably slightly less than, the theoretical amount required to remove the desired number of alkyl groups. Thus, when converting dialkyl-substituted ureas to monoalkyl-substituted ureas, somewhat less than one molar equivalent, preferably about 0.9 equivalent, of ammonia should be added for each molar equivalent of dialkyl-substituted urea used as a starting material.

Although the dealkylation reaction may be carried out in the absence of a solvent, it is preferred to use a mutual solvent for ammonia and for the alkyl-substituted urea, since use of a solvent makes possible more accurate control of the reaction. Any solvent may be employed which is capable of dissolving ammonia and an alkyl-substituted urea, which solvent is non-reactive under the conditions of the reaction. Suitable solvents are, for example, hot water, the lower aliphatic alcohols, the $C_3$–$C_6$ ketones, the ethers such as dibutyl ether, the mixed aromatic aliphatic ethers and the hydrocarbon solvents, particularly the aromatic hydrocarbon solvents. Preferred solvents are the lower aliphatic alcohols, i. e. the $C_1$–$C_5$ alcohols, particularly methyl alcohol, ethyl alcohol, and the propyl alcohols. The solvents may be employed in any desired amount provided that sufficient solvent is employed to completely dissolve the alkyl-substituted urea and the ammonia.

Any material which is active as a hydrogenation-dehydrogenation catalyst may be employed to effect the dealkylation. Suitable catalysts therefore include such materials as finely divided nickel, nickel on kieselguhr, nickel on pumice, colloidal platinum, finely divided palladium, metallic chromium, alumina, iron oxide-chromium oxide compositions, copper oxide-chromium oxide compositions and the like. Active nickel catalysts have proved particularly effective, active nickel in the form commonly referred to as Raney nickel being a preferred catalyst for carrying out the dealkylation process. The catalyst may be employed in any suitable amount, the amount used being dependent upon the nature of the catalyst, the character of the reacting substances, the operating conditions, etc. In general, however, an amount of catalyst ranging from between about 0.5% and about 6%, preferably about 2%, based on the amount of alkyl-substituted urea, represents a suitable amount when carrying but the process as a batch process. In continuous operation a sufficient amount of catalyst should be used to secure the desired conversion within the contact time employed.

The process may be carried out in batch, intermittent or continuous fashion, using any type of apparatus adapted to securing the desired operating conditions.

The degraded urea may be isolated from the reaction mixture and purified by any desired method, as by fractional distillation or fractional crystallization from a suitable solvent. In a preferred method the reaction mixture may be worked up by adding a suitable quantity of a diluent, e. g. water, and distilling the resulting mixture, thereby separating the primary amine which is a product of the reaction as well as any solvent which may be present. After removal of the primary amine and the solvent the aqueous mixture may be cooled to separate the higher urea derivatives, i. e. the unreacted starting material. The mother liquor may then be evaporated under reduced pressure if desired, thereby concentrating the solution sufficiently to effect the separation of the desired degraded urea.

The dealkylation step in the conversion of urea to pure monoalkyl-substituted ureas may be illustrated by the following example in which the amounts of reactants are given in parts by weight.

A mixture comprising about 5 parts of symmetrical diisopropyl urea, 10 parts ethanol, 0.2 part Raney nickel and 0.6 part ammonia, was reacted for about 2 hours at a temperature of about 125° C. and an initial pressure of about 150 p. s. i. At the end of the reaction period the catalyst was removed by filtration and the catalyst-free mixture diluted with water. The aqueous mixture was then distilled to remove isopropyl alcohol and isopropyl amine. The distilled mixture was then cooled, thereby effecting the separation of any unreacted diisopropyl urea which was removed by filtration. The aqueous residue was then concentrated at reduced pressure. This resulted in the separation of the desired monoisopropyl urea.

I claim as my invention:

1. A method for the dealkylation of unsymmetrical di-n-butyl urea which comprises dissolving the said di-n-butyl urea and ammonia in a solvent comprising a lower aliphatic alcohol, and heating a mixture of the resulting solution and an active nickel catalyst to a temperature of about 125° C. at a pressure of about 100 lbs. per sq. in.

2. A method for the removal of butyl groups from urea derivatives having butyl groups substituted upon the nitrogen atoms thereof which comprises reacting the said urea derivative with ammonia at a temperature of between about 100° C. and about 200° C., at a pressure of between about 50 lbs. per sq. in. and about 150 lbs. per sq. in., and in the presence of a catalyst comprising active nickel and of a mutual solvent for the said urea derivative and ammonia.

3. A process for the dealkylation of symmetrical diisopropyl urea which comprises forming a solution of diisopropyl urea and ammonia in an alcohol solvent, and contacting the said solution with a catalyst comprising active nickel at a temperature of about 125° C. and a pressure of about 100 lbs. per sq. in.

4. A process for the removal of propyl groups from N-propyl ureas which comprises contacting a mixture of the said N-propyl urea, ammonia and a solvent with an active nickel catalyst at a temperature of between about 100° C. and about 200° C. and at a pressure of between about 50 lbs. per sq. in. and about 150 lbs. per sq. in.

5. A process for dealkylating N-alkyl substituted urea derivatives wherein the alkyl groups substituent upon the nitrogen atoms of the urea molecule contain fewer than seven carbon atoms, which comprises reacting the said N-alkyl substituted urea with ammonia at a temperature of between about 100° C. and about 200° C., at a pressure of between about 50 lbs. per sq. in. and about 150 lbs. per sq. in., and in the presence of a hydrogenation-dehydrogenation catalyst comprising active nickel.

6. A process for the removal of alkyl groups from N-alkyl substituted ureas which comprises contacting a mixture comprising an alkyl-substituted urea and ammonia with a hydrogenation-dehydrogenation catalyst at a temperature of between about 50° C. and about 450° C., and at a pressure of between about 15 lbs. per sq. in. and about 500 lbs. per sq. in., thereby forming a reaction mixture comprising a dealkylated urea and an aliphatic primary amine, and separating the said dealkylated urea from the said reaction mixture.

7. A process for the dealkylation of alkyl-substituted ureas which comprises reacting an alkyl-substituted urea with ammonia at a pressure of between about 15 lbs. per sq. in. and about 500 lbs. per sq. in. and in the presence of a hydrogenation-dehydrogenation catalyst.

8. A process for the degradation of urea derivatives having hydrocarbon radicals substituted upon the nitrogen atoms thereof which comprises continuously contacting a mixture of ammonia and the said urea derivative with a hydrogenation-dehydrogenation catalyst at a reaction temperature and at a pressure of between about 15 lbs. per sq. in. and about 500 lbs. per sq. in., thereby forming a reaction mixture comprising a degraded urea and primary amine, continuously withdrawing the said reaction mixture from the reaction chamber, and separating the degraded urea from the said reaction mixture.

9. A process for the reversion of N-substituted urea derivatives which comprises contacting a mixture comprising the said N-substituted urea derivative and ammonia with a hydrogenation-dehydrogenation catalyst at a reaction temperature and at a pressure of between about 15 lbs. per sq. in. and about 500 lbs. per sq. in.

10. A process for the removal of hydrocarbon radicals from urea derivatives having hydrocarbon radicals substituted upon the nitrogen atoms of the urea molecule which comprises reacting the said urea derivative with ammonia at superatmospheric pressure in the presence of a catalyst.

11. A process for the production of substantially pure mono-butyl urea from di-butyl urea which comprises forming an alcoholic solution of di-butyl urea and an approximately equimolar quantity of ammonia, contacting the said mixture with an active nickel catalyst at a temperature of between about 100° C. and about 200° C. and at a pressure of between about 50 lbs. per sq. in. and about 150 lbs. per sq. in., thereby forming a reaction mixture comprising mono-butyl urea and di-butyl urea, extracting the said reaction mixture with water, thereby separating the said mono-butyl urea from the said di-butyl urea, and evaporating the aqueous solution of mono-butyl urea to separate the said mono-butyl urea therefrom.

12. A process for the production of substantially pure mono-isopropyl urea which comprises reacting diisopropyl urea with an approximately equimolar amount of ammonia at a temperature of between about 100° C. and about 200° C. and at a pressure of between about 50 lbs. per sq. in. and about 150 lbs. per sq. in., said reaction being effected in alcoholic solution and in the presence of a catalyst comprising active nickel, and separating the mono-isopropyl urea from the reaction mixture by extracting the said reaction mixture with water, thereby forming an aqueous solution of the said mono-isopropyl urea, and evaporating the said aqueous solution to obtain the desired mono-isopropyl urea in the solid state.

13. A process for the preparation of mono-alkyl substituted ureas which are substantially free from urea which comprises contacting a mixture comprising a di-alkyl substituted urea wherein the alkyl groups contain fewer than six carbon atoms, a solvent, and ammonia in an amount of about one molar equivalent of ammonia for each molar equivalent of the said dialkyl substituted urea, with an active nickel catalyst, at a temperature of between about 50° C. and about 250° C. and at a pressure of between about 15 lbs. per sq. in. and about 500 lbs. per sq. in., thereby forming a reaction mixture which contains a mono-alkyl substituted urea together with a relatively minor amount of di-alkyl substituted urea, and separating the said mono-alkyl substituted urea from the said di-alkyl substituted urea by extracting the said reaction mixture with an aqueous solvent.

14. A method for the production of mono-alkyl substituted ureas which comprises contacting a mixture comprising at least one species of an alkyl urea having more than one alkyl group of less than six carbon atoms, ammonia, and a mutual solvent for the said alkyl urea and ammonia with a hydrogenation-dehydrogenation catalyst at a temperature of between about 50° C. and about 450° C. and at a pressure of between about 15 lbs. per sq. in. and about 500 lbs. per sq. in., thereby forming a mixture of mono-alkyl substituted urea and of higher alkyl ureas, and separating the said mono-alkyl urea from the said higher alkyl ureas by extraction with an aqueous solvent medium.

15. A method for the production of mono-alkyl substituted ureas which comprises reacting at least one species of alkyl urea having more than one alkyl group of less than six carbon atoms with ammonia at a pressure of between about 15 lbs. per sq. in. and about 500 lbs. per sq. in., at a reaction temperature, and in the presence of a hydrogenation-dehydrogenation catalyst, thereby forming a reaction mixture comprising a mono-alkyl substituted urea together with higher alkyl ureas, and separating the said mono-alkyl substituted urea from the said higher alkyl urea.

16. A process for the preparation from urea of mono-isopropyl urea which comprises isopropylating urea, thereby forming a reaction mixture essentially comprising diisopropyl urea but containing also lesser amounts of unreacted urea and of mono-isopropyl urea, contacting the said reaction mixture with water, thereby separating the water-insoluble diisopropyl urea from the water-soluble urea and mono-isopropyl urea, degrading the said diisopropyl urea to mono-isopropyl urea by forming a solution in a lower aliphatic alcohol of the said diisopropyl urea and ammonia in the ratio of about two molar equivalents of diisopropyl urea to about 0.9 molar equivalent of ammonia and contacting the said solution with a catalyst comprising active nickel at a temperature of between about 100° C. and about 200° C. and a pressure of between about 50 lbs. per sq. in. and about 150 lbs. per sq. in., thereby forming a reaction mixture comprising monoisopropyl urea together with a lesser amount of unreacted diisopropyl urea, and contacting the said reaction mixture with water, thereby effecting the separation in a substantially pure state of the water-soluble mono-isopropyl urea.

17. A method for the production from urea of mono-alkyl ureas wherein the alkyl groups substituent upon the nitrogen atoms of the ureas contain fewer than six carbon atoms, which comprises alkylating urea, thereby forming a reaction mixture composed primarily of higher alkyl ureas, but also containing lesser amounts of unreacted urea and of a mono-alkyl urea, treating the said reaction mixture with water, thereby separating the water-insoluble higher alkyl ureas from the water-soluble urea and mono-alkyl urea, effecting the reversion of the higher alkyl ureas to a mono-alkyl urea by dissolving the said higher alkyl ureas together with an amount of ammonia which is sufficient to provide slightly less than one molar equivalent of ammonia for each alkyl group in excess of one present in the urea molecule in a solvent comprising a lower aliphatic alcohol, and contacting the resulting alcoholic solution of higher alkyl ureas and ammonia with a hydrogenation-dehydrogenation catalyst comprising active nickel at a temperature of between about 50° C. and about 450° C. and at a pressure of between about 15 lbs. per sq. in. and about 500 lbs. per sq. in., thereby forming a second reaction mixture comprising preponderantly a mono-alkyl urea but containing also a lesser amount of unreacted higher alkyl ureas, and contacting the said second reaction mixture with water, thereby effecting the separation of the water-soluble mono-alkyl urea in a relatively pure state and substantially free from urea and from higher alkyl ureas.

18. A process for the production from urea of mono-alkyl ureas wherein the alkyl groups substituted upon the nitrogen atoms of the ureas contain fewer than six carbon atoms, which comprises alkylating urea, thereby forming a reaction mixture comprising unreacted urea, a monoalkyl urea, and a preponderant amount of higher alkyl ureas, contacting the said reaction mixture with an aqueous solvent, thereby extracting the said urea and the said mono-alkyl urea from the said higher alkyl ureas, degrading the said higher alkyl ureas to a mono-alkyl urea by contacting a mixture comprising the said higher alkyl ureas, ammonia, and a solvent with a hydrogenation-dehydrogenation catalyst at a temperature of between about 50° C. and about 450° C. and at a pressure of between about 15 lbs. per sq. in. and about 500 lbs. per sq. in., thereby forming a second reaction mixture containing a mono-alkyl urea together with a relatively minor amount of unreacted higher alkyl ureas, and contacting the said second reaction mixture with an aqueous solvent, thereby separating a mono-alkyl urea which is substantially free from urea and from higher alkyl ureas.

19. A process for the preparation of substantially pure mono-alkyl ureas wherein the alkyl groups substituted upon the nitrogen atoms of the ureas contain fewer than six carbon atoms, which comprises alkylating urea, thereby forming a reaction mixture comprising unreacted urea, monoalkyl urea, and alkyl ureas which contain more than one alkyl group, extracting the said reaction mixture with a solvent capable of separating the said urea and mono-alkyl urea from the said alkyl ureas containing more than one alkyl group de-alkylating the said alkyl ureas which contain more than one alkyl group by reacting them with ammonia in the presence of a hydrogenation-dehydrogenation catalyst at a pressure of between about 15 lbs. per sq. in. and about 500 lbs. per sq. in. and a temperature of between about 50° C. and about 450° C., thereby forming a reaction mixture containing mono-alkyl urea together with unreacted higher-alkyl ureas, and separating the said mono-alkyl urea from the said higher alkyl ureas by extracting the said second reaction mixture with a selective solvent for the said mono-alkyl urea.

VERNON E. HAURY.